May 12, 1959  J. F. CAMPBELL  2,885,728
APPARATUS FOR VULCANIZING V-BELTS AND THE LIKE
Filed May 17, 1957  4 Sheets-Sheet 1

INVENTOR.
JOHN F. CAMPBELL
BY
Oedlam & Oedlam
ATTYS.

May 12, 1959 J. F. CAMPBELL 2,885,728
APPARATUS FOR VULCANIZING V-BELTS AND THE LIKE
Filed May 17, 1957 4 Sheets-Sheet 2

INVENTOR.
JOHN F. CAMPBELL
BY
Oldham & Oldham
ATTYS.

May 12, 1959 J. F. CAMPBELL 2,885,728
APPARATUS FOR VULCANIZING V-BELTS AND THE LIKE
Filed May 17, 1957 4 Sheets-Sheet 3

INVENTOR.
JOHN F. CAMPBELL
BY
Oldham & Oldham
ATTYS.

May 12, 1959 J. F. CAMPBELL 2,885,728
APPARATUS FOR VULCANIZING V-BELTS AND THE LIKE
Filed May 17, 1957 4 Sheets-Sheet 4

INVENTOR.
JOHN F. CAMPBELL
BY
Dedham & Dedham
ATTYS.

2,885,728
APPARATUS FOR VULCANIZING V-BELTS AND THE LIKE

John F. Campbell, Cuyahoga Falls, Ohio

Application May 17, 1957, Serial No. 659,974

3 Claims. (Cl. 18—7)

This invention relates to apparatus for vulcanizing V-belts and the like, and more particularly, is concerned with fully automatic apparatus utilizing an expansible and contractible mold for carrying the belt or other articles, and a flexible sleeve or diaphragm movable into pressure relationship with the exposed surface of the belt or articles during the vulcanizing operation.

The invention constitutes an improvement upon the apparatus disclosed and claimed in my prior U.S. Patent No. 2,583,085 insofar as the vulcanizing equipment is concerned, and the present invention utilizes, as does the apparatus of my Patent No. 2,583,085, a collapsible V-belt mold of the type disclosed and claimed in my U.S. Patent No. 2,586,300.

It is the general object of my invention to provide an improved apparatus of substantially fully automatic character adapted to vulcanize V-belts and the like, and characterized by ease of removing vulcanized articles and inserting unvulcanized articles in the apparatus, inexpensiveness of construction, rapidity of operating cycle, and long operating life with low maintenance.

Another object of my invention is the provision of a V-belt vulcanizing apparatus of the type described and adapted to handle a plurality of sizes of vulcanizing molds.

Another object of my invention is the provision of V-belt vulcanizing apparatus wherein one operator can handle a plurality of units inasmuch as the operator needs only remove the vulcanized belts from an easily accessible position and load the mold with unvulcanized belts.

The foregoing objects of my invention, and other objects which will become apparent as the description proceeds, are achieved by the provision of apparatus for vulcanizing V-belts and the like including a pot-heater, a cage inside the heater, a flexible diaphragm carried by the cage, a closure for the pot heater, an expandible and collapsible mold carried by the closure and extending into the pot heater inside the cage in proximity to the diaphragm when the closure is in closure position, means for collapsing the diaphragm against the cage to allow the introduction of the mold into the cage, means for expanding the diaphragm against the mold when in the cage, means for mounting the closure for movement to closure position and to a position remote from closure position to allow articles formed in the mold to be removed and green articles to be molded to be placed in the mold, means for releasably locking the closure on the pot heater, and means mounted on the means carrying the closure and extending through the closure for collapsing and expanding the mold.

The apparatus preferably includes, also, means for adjusting the mold collapsing and expanding means to adapt it to handle molds of a variety of sizes, and for allowing interchangeability of cages.

For a better understanding of my invention reference should be had to the accompanying drawings wherein Fig. 1 is a side elevation, partially broken away, of one embodiment of apparatus inncorporating the principles of my invention;

Fig. 7 is a fragmentary end elevation of the cage mounted in the pot heater.

Figure 1:
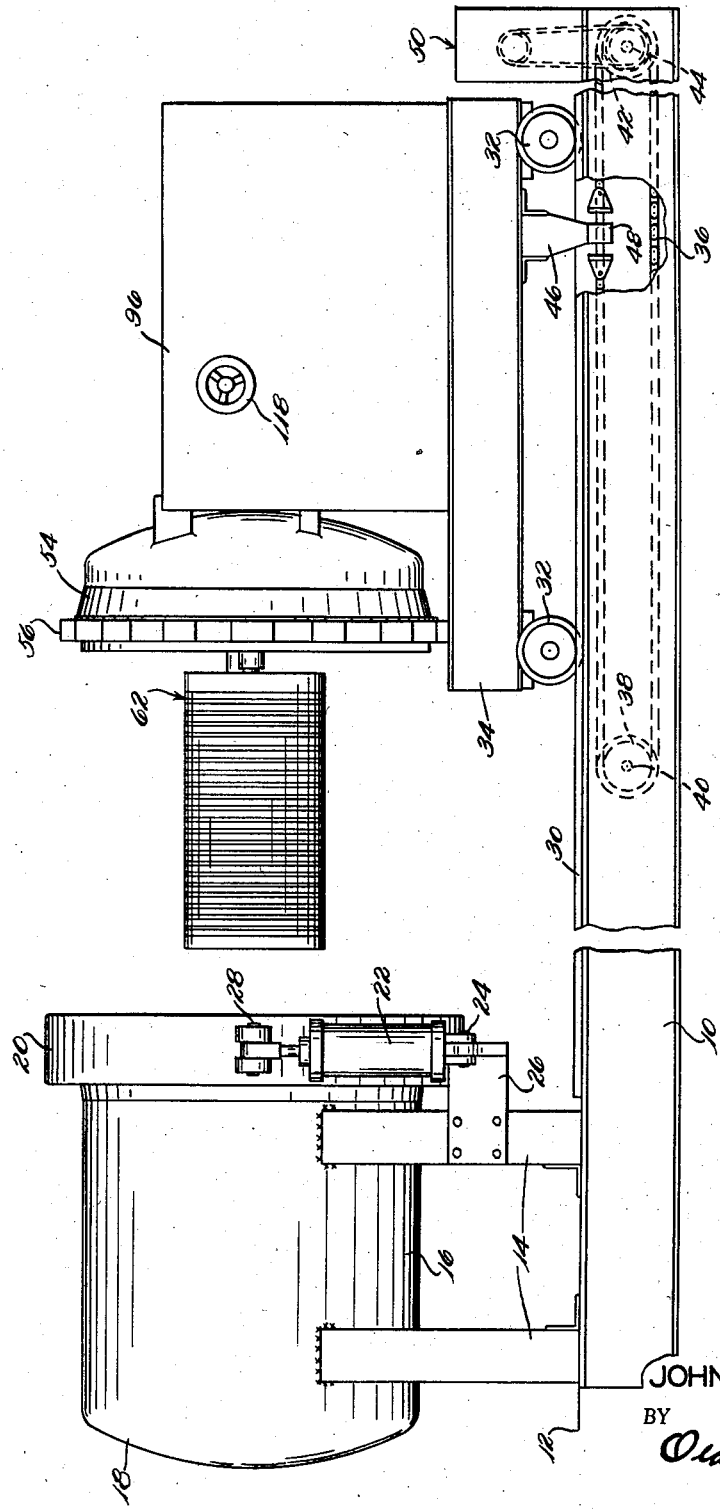

In the drawings, the numeral 10 indicates a base adapted to be set down in the floor, for example, with the floor level being at line 12.

At one end of the base 10, upon suitable supports 14, is mounted a pot heater 16 positioned with its axis horizontal and closed at the end 18. A bayonet joint type lock ring 20 is mounted for limited arcuate movement at the other open end of the pot heater, the locking and unlocking arcuate movement of the ring 20 being achieved by means of a hydraulic cylinder 22 pivotally mounted at 24 on a bracket 26 carried on supports 14, and having its piston rod pivotally fastened at 28 to the lock-ring 20.

The base 10 supports a pair of rails 30 on its upper surface upon which ride flanged wheels 32 rotatably supported on a car 34 thus mounted for movement to and from the pot heater 16. To provide movement of the car 34 in the manner described, I provide suitable means, for example, an endless chain 36 carried over a sprocket 38 journalled on a shaft 40 in the base 10 and a sprocket 42 secured to a shaft 44 likewise journalled in the base 10. A bracket 46 fastened to the car 34 extends downwardly through a slot between the rails 30 and extending longitudinally of the base 10 and into a cushioned lost motion connection 48 with the chain 36. Suitable driving means are provided for shaft 44, for example, a reversible electric motor, reduction gear box, and V-belt drive, all generally indicated by the numeral 50.

Figure 2:
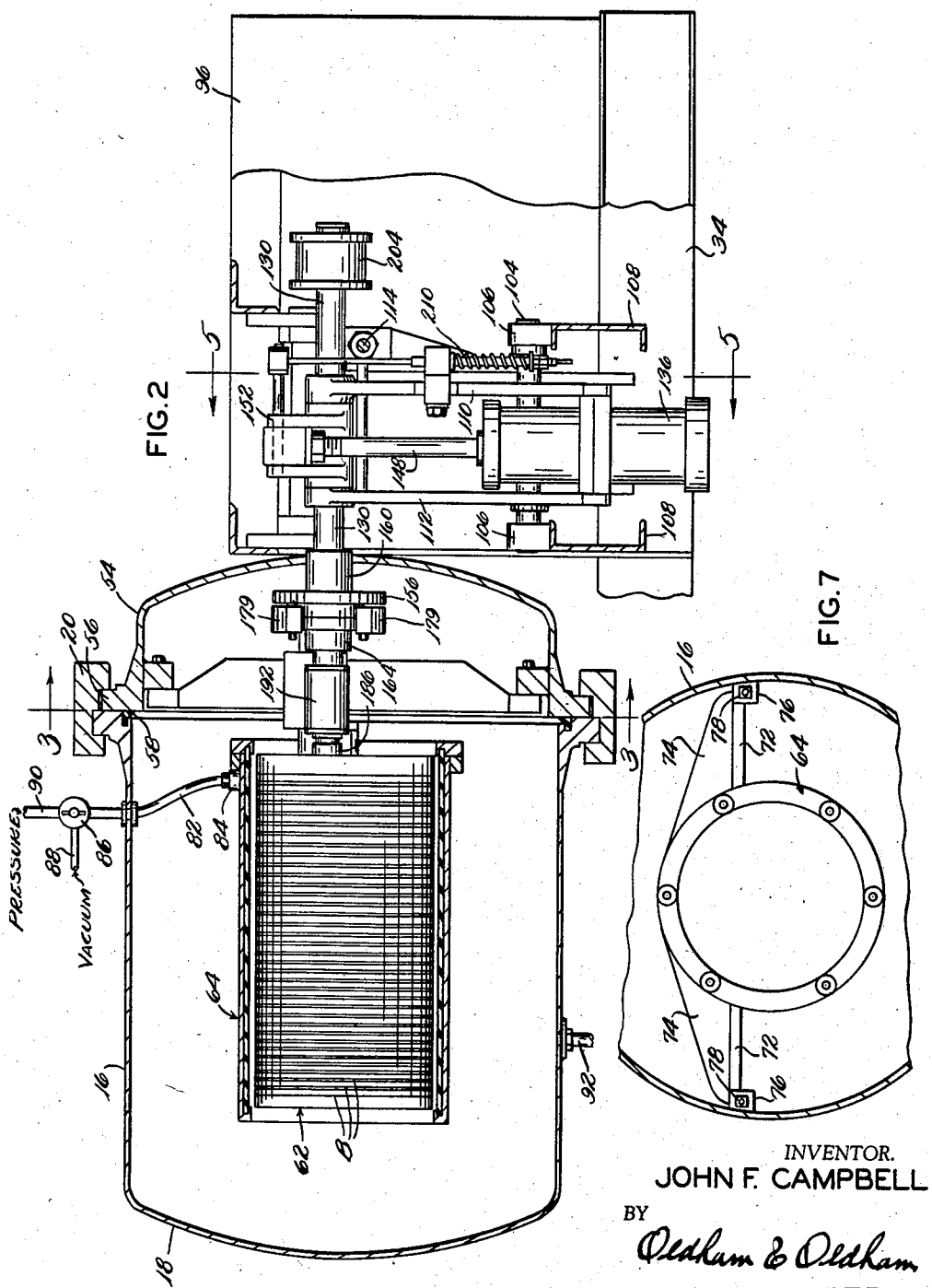
Fig. 2 is an enlarged fragmentary longitudinal sectional view of a portion of the apparatus shown in Fig. 1.

Rigidly mounted on the car 34 is a closure 54 for the pot heater, the closure being provided with a bayonet joint 56 capable of stabbing into and out of the lock ring 20 when the ring 20 is in the unlocked position, but with the closure 54 being locked tightly on the pot heater 16 when the ring 20 is turned to locked position, as seen in Fig. 2. This figure of the drawing also illustrates that a gasket 58 can be carried by the end of the pot heater to seal tightly against the closeure 54 when the closure is locked on the pot heater.

The closure 54 supports a horizontally extending shaft 60 which slidably receives a collapsible V-belt mold 62 of the type shown in my U.S. Patent No. 2,586,300, the mold being secured to the shaft 60 by the simple expedient of a nut on the end of the shaft (not shown). The shaft 60 supports the mold 62 for movement into and out of a cage, indicated as a whole by the numeral 64, and of the general type disclosed and claimed in my U.S. Patent No. 2,583,085.

Figure 6:
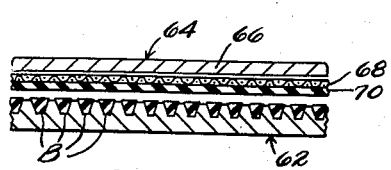
Fig. 6 is an enlarged fragmentary cross-sectional view illustrating the construction of the cage and mold associated with the pot heater.

Actually the cage 64 in the embodiment of the invention illustrated includes a cylindrical frame 66 having a lining of rather coarse wire screen 68, for example stainless steel, and a flexible diaphragm or sleeve 70 of rubber secured at its ends in fluid-tight relation with the frame 66. Fig. 6 shows an enlarged detail of the cage 64 as including the frame 66, the lining 68, and the diaphragm 70 positioned in association with the collapsible mold 62 which has been illustrated in cross-section as supporting a plurality of V-belts B.

The cage 64 is removably mounted in the pot-heater 16 by providing opposed ribs on the inside of the pot-heater which slidably receive plates 72 welded to the sides of the cage 64 in the manner shown in Fig. 7, the plate 72 being strengthened by brackets 74 likewise welded in position. Blocks 76 releasably secured in place by nuts 78 hold the plate 72 and the cage 64 in position, but can quickly be removed to allow the cage 64 in the pot-heater to be pulled out and a cage of different size substituted if belts of a different diameter or other articles are to be vulcanized.

A flexible conduit 82 is releasably connected by means 84 to the frame 66 of the cage 64 and the conduit 82 extends through the wall of the pot-heater 16 to a valve 86 adapted to connect a vacuum line 88 or a fluid pressure line 90 to the back of the diaphragm 70. It will be understood that the valve 86 is turned, usually by automatic timer means, to connect the vacuum line 88 to the inside of the diaphragm 70 during the time that the mold 62 is moving in and out of the cage 64. But with the mold and belts B to be vulcanized inside of the cage 64, the valve 86 is turned to apply fluid under pressure behind the diaphragm 70 to press it firmly against the exposed outer periphery of the belts B in the mold 62 during the period of the vulcanization of the belts. The pressure applied to the diaphragm 70 can be air pressure, or it may be steam to assist in the belt vulcanizing operation. One or more conduits 92 connected to the pot heater 16 apply vulcanizing fluid, usually steam, to the pot heater.

An important feature of the invention is the provision of mechanism for collapsing and expanding the mold 62, such mechanism extending through the closure 54 and being contained inside the cover 96 carried on the car 34 and best shown in Fig. 1. Figs. 3, 4, 5 and 6 best show the details of the mechanism for opening and closing the mold 62. More specifically, and having reference to Fig. 5, the mechanism includes a hub 100 secured to the end of the mold support shaft 60, extending through the closure 54, the hub 100 having a plate 102 secured thereto and extending downwardly and secured at its lower end to a shaft 104. The shaft 104 is fixed at its ends in blocks 106 fastened upon cross channels 108 mounted on the car 34.

The shaft 104 supports for arcuate movement a pair of arms 110 and a pair of arms 112, and the upper ends of both pairs of arms are adapted to be moved toward or from each other by means of a shaft 114 axially fixed but rotatably mounted at 116 in the plate 102, the shaft 114 being rotated by hand wheel 118 positioned outside of the casing 96. The portion 120 of the shaft 114 extending to one side of the plate 102 is made with a right hand thread which engages with a nut 122 carried in one of the arms 110, and the portion 124 of the shaft 114 lying on the other side of the plate 102 is formed with a left hand thread which engages with a nut 126 carried in the other of the arms 110.

Thus, movement in and out or towards and from each other of the upper ends of each of the pairs of arms 110 and 112 can be effected to adapt the mechanism to handle molds of different sizes, as now more particularly described. The upper ends of one arm 110 and one arm 112 rotatably support a shaft 130, and the upper ends of the other arm 110 and the other arm 112, rotatably support a shaft 132, both shafts 130 and 132 extending through the closure 54 and into driving relation with the hinges of collapsible mold 62 so that rotation of the shafts 130 and 132 collapses or expands the mold 62 as will be understood from the construction of the mold as described in my Patent No. 2,586,300.

Figure 5:
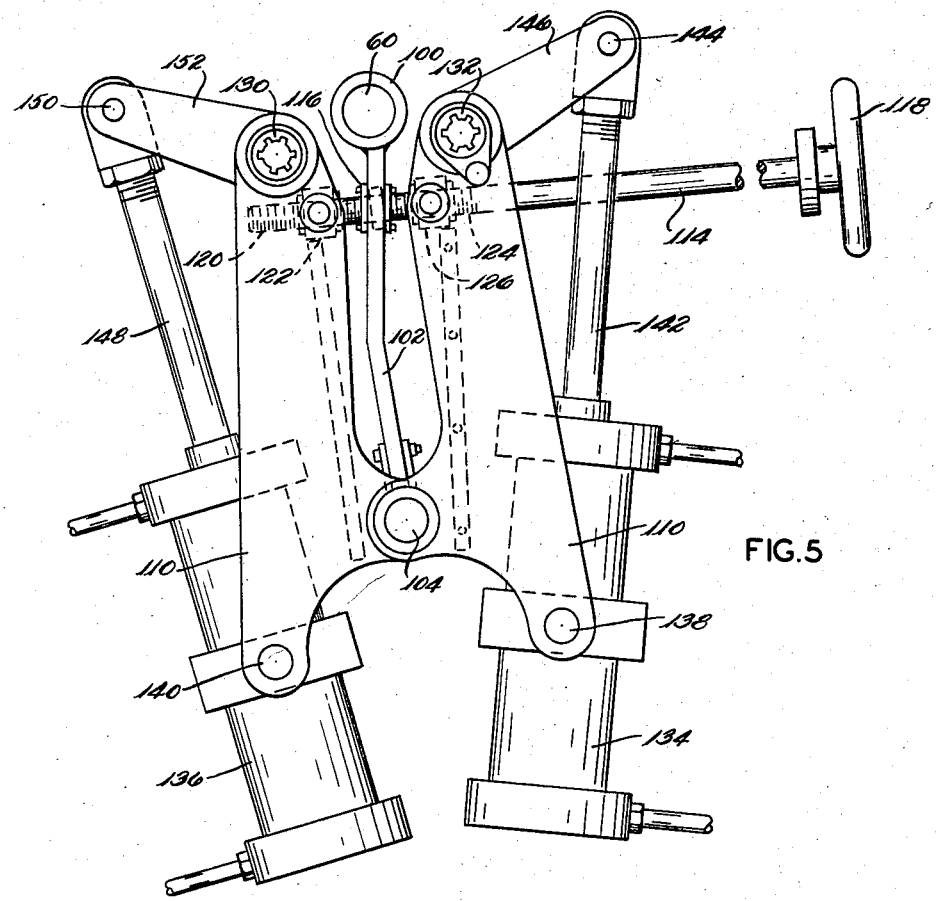
Fig. 5 is an end elevation of the mechanism for collapsing and expanding the mold and for adapting this mechanism to handle molds of different sizes.

Still having reference to Fig. 5, the shafts 130 and 132 are adapted to be rotated through an arc by means of a pair of double acting pneumatic pressure cylinders 134 and 136 pivotally mounted near their centers on trunnions 138 and 140 journalled in the lower ends, respectively, of one arm 110 and one arm 112, and in the lower end of the other arm 110 and the other arm 12. Piston rod 142 of pressure cylinder 134 extends upwardly and is pivotally connected at 144 to an arm 146 fastened to the shaft 132. In a like manner, piston rod 148 of pressure cylinder 136 extends upwardly and is pivotally connected at 150 to an arm 152 fastened to shaft 130. Appropriate conduits are provided at opposite ends of the pressure cylinders 134 and 136 for moving the pistons up or down to expand or collapse the mold 62.

Figure 3:
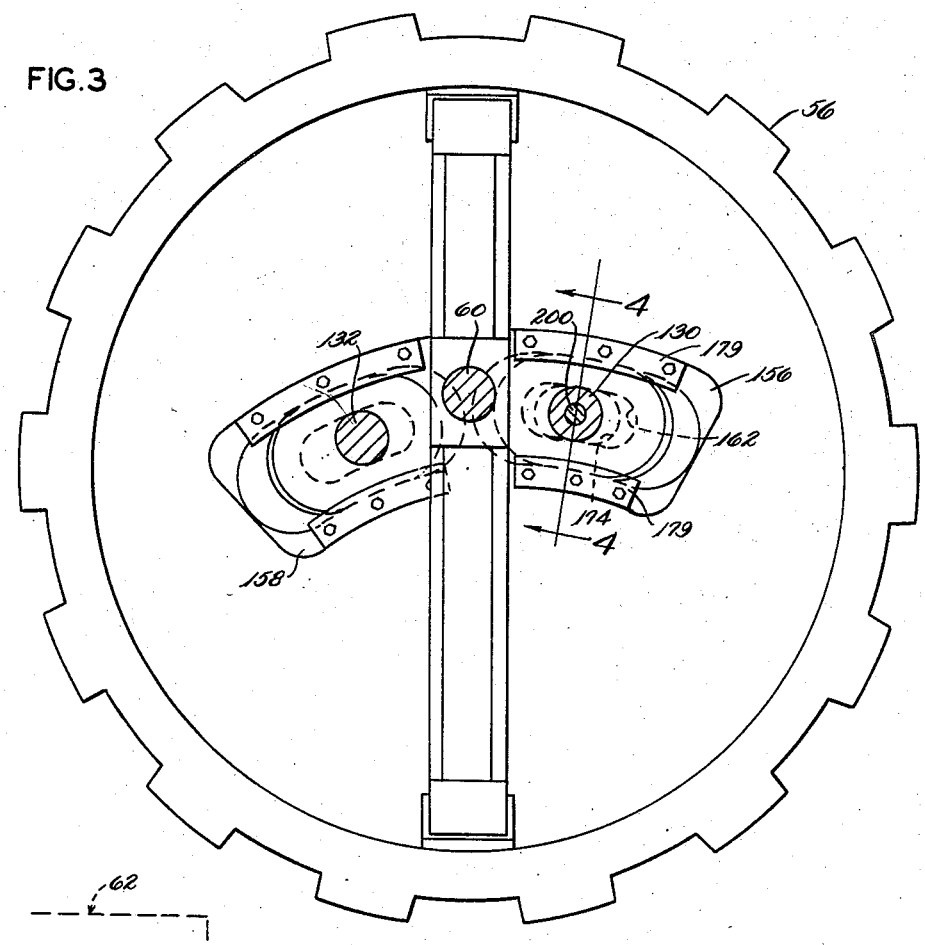
Fig. 3 is an enlarged cross-sectional view taken substantially on line 3—3 of Fig. 2, and illustrating details of the closure and mold collapsing and expanding mechanism.
Figure 4:
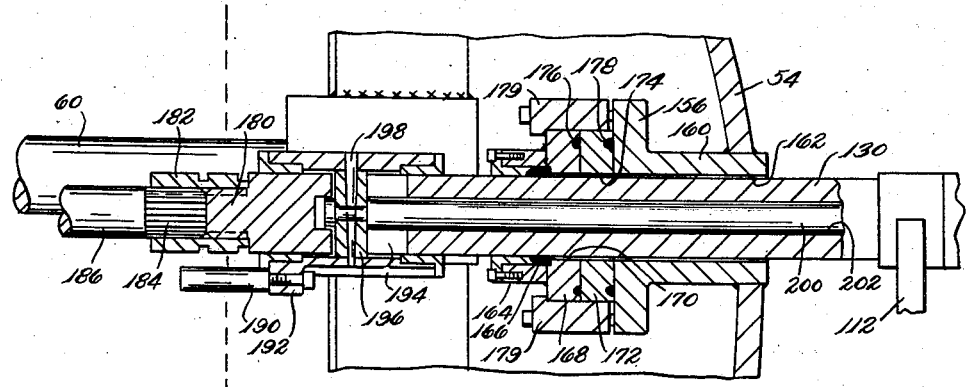
Fig. 4 is an enlarged cross-sectional view taken substantially on line 4—4 of Fig. 3.

Referring to Figs. 3 and 4, the manner of sealing between the shafts 130 and 132 and the closure 54 in fluid-type relation will be described. This is accomplished by providing a fitting 156 and a fitting 158 each having a stem portion 160 welded to the closure 54, the stem portion 160 defining an arcuate opening 162 of a shape to allow the arcuate movement of shafts 130 and 132 as controlled by the right and left hand threaded shaft 114. This movement can likewise be described in reference to Fig. 4 as movement of the shaft 130 toward or away from the viewer of Fig. 4. Rotatably fixed to the shaft 130 is a collar 164 having packing 166 for sealing between the collar and the shaft and secured to the collar 164 is a kidney shaped plate 168 having a hole 170 therethrough to receive the shaft 130. Plate 168 could engage directly with the plate-shaped end of the fitting 156 in sealing relation, but in order to cover the arcuate opening through the fitting 156, the plate 168 would have to be of considerable arcuate extent. Therefore, an additional plate 172, again of kidney shape, and having an arcuate opening 174 therethrough of approximately half the arcuate length of the arcuate opening through stem 160 and fitting 156 is provided. Suitable packing means of endless contour and identified by the numerals 176 and 178 are provided between plates 168, 172 and the face of fitting 156.

In order for the end of the shaft 130 nearest to the pot-heater to releasably engage with the hinge-pin of the collapsible mold 62, it is reduced in diameter at 180 and fixed thereto is an internally splined cup-like extension 182 which engages with the the splined end 184 of the hinge-pin 186 of the mold. It will be understood that when the mold 62 is fixed to the shaft 60, as previously described, that the hinge-pin 186 of the mold is held at all times in the splined cup 182.

Arcuate gibs 179 appropriately fixed by cap screws to fitting 156 slidably support plates 168 and 172 in sealing relation with each other and with the fitting 156.

Suitable means are likewise provided for locking and unlocking the mold 62, and these means take the form of a pin 190 directed toward the molds 62 and affixed to a collar 192 slidably mounted upon the shaft 130. The shaft 130 is formed with a diametrical slot 194 and slidably received in this slot is a block 196 which is affixed to the collar 192 by a pin 198. The block 196 is suitably fastened to the end of a rod 200 slidably received in a bore 202 of the shaft 130, the rod 200 constituting an extension of the piston rod of a fluid pressure cylinder 204 mounted upon the end of the shaft 130 inside the casing 196. Thus, operation of pressure cylinder 204 moves rod 200 to move collar 192 and pin 190 to lock or unlock mold 62. The actual locking mechanism is described and illustrated in my U. S. Patent No. 2,586,300.

The construction and arrangement for passing the shaft 132 through the closure 54 is substantially identical to that described in conjunction with shaft 130, except that shaft 132 does not have rod 200 extending therethrough. Accordingly, the mechanism for passing shaft 132 through the closure 54 will not be described in detail.

Spring and linkage mechanism 210 may be incorporated with the crank arm 152 for control or cushioning purposes.

It will be also understood that the entire mechanism is made sequentially automatic in accord with known timing and control mechanism which is not new per se and which will not be described and claimed.

It is believed that the operation of the apparatus will be understood from the foregoing description. Suffice it to say here that in a complete vulcanizing cycle, and with the parts in the position shown in Fig. 1, and with the mold 62 collapsed, a plurality of green, i.e., unvulcanized V-belts can be readily placed by the operator at approximately chest height on the grooves in the collapsed mold. Thereafter, the mold 62 is expanded, motor 50 is operated to move car 34 to the left to bring closure 54 against pot-heater 16 whereupon pressure cylinder 22 is operated to turn lock ring 20 to lock the closure on the heater. The movement to the left in the manner described of the mold 62 moves it inside of cage 64. During the movement of the mold 62 into cage 64, vacuum is supplied to conduit 82 to hold diaphragm 70 out of the way. Once closure 54 is locked in place, fluid under pressure, for example steam, is applied through conduit 82 to move diaphragm 70 tightly into engagement with the belts B on mold 62 and steam or other curing fluid is introduced into the inside of the pot-heater 16 by way of conduit 92. It will be noted that steam heat flowing inside of mold 62 and around the cage 64 effects a relatively close contact with the belts B and a very rapid vulcanization thereof.

Upon completion of the cure, steam is exhausted from the pot-heater 16, valve 86 is turned to pull diaphragm 70 away from the surface of mold 62, pressure cylinder 22 is reversed to unlock closure 54, motor means 50 are reversed to move car 34 to the right to return the mold 62 to the position of Fig. 1, mold 62 is collapsed by operation of pressure cylinders 134 and 136, the cured belts are stripped from the collapsed mold, and the cycle is ready to be repeated.

In the event that belts of a different size are to be vulcanized in the apparatus, it is a relatively simple matter to replace the cage 64 with the desired sized cage, and to replace the mold 62 with the desired size mold. When this is done, it may be necessary to rotate hand wheel 118 to adjust the shafts 130 and 132 toward or from each other to take care of the different hinge-pin spacing of the different sized molds.

From the foregoing, it will be recognized that the various objects of my invention have been achieved, by a particularly practical and efficient apparatus easily serviced by an operator.

While in accord with the patent statutes one specific embodiment of my invention has been illustrated and described, it is to be particularly recognized that I am not to be limited thereto or thereby but that the scope of the invention is defined in the appended claims.

I claim:

1. Apparatus for molding V-belts and the like including a horizontally disposed pot heater, a cylindrical cage inside the heater coaxial thereof, a flexible diaphragm carried by the cage, a closure for the pot heater, a peripherally-grooved expandable and collapsible drum mold having a fixed segment and movable segments connected by hinge pins to the fixed segment, a shaft rigidly carried by the closure and extending axially into the pot heater inside the cage, means securing the fixed segment of the drum mold rigidly to the shaft so as to support the mold in proximity to the diaphragm when the closure is in closure position, fluid pressure means for pressing the diaphragm against the mold when in the cage, means for supplying vulcanizing fluid to the pot heater, rails extending axially of the heater, carriage means mounting the closure and said drum in fixed axially spaced relation for movement axially of the pot heater along said rails to closure position and to a position remote from closure position to allow articles formed in the mold to be removed and green articles to be molded to be placed in the mold, means for releasably locking the closure on the pot heater, a pair of shafts mounted on the carriage means and extending in sealing relation through the closure into engagement with the hinge pins of the mold for collapsing and expanding the mold, and means for changing the spacing of the pair of shafts extending through the closure to adapt the apparatus to handle molds having hinge pins of different spacing.

2. Apparatus for molding endless belts and the like, said apparatus comprising a cylindrical open ended heater having its axis disposed horizontally, said heater having a bayonet joint locking ring at its open end adapted to engage a closure member by and to be locked therewith by a rotary movement of the ring, guide rails extending axially of the heater, a carriage movable along said rails to and from the open end of the heater, a closure member non-rotatably mounted on said carriage for engagement with said heater, a cage mounted axially of said heater and having a flexible diaphragm adapted to embrace a drum-type curing mold, a curing mold supported on said carriage in fixed spaced relation thereto and on said closure member for axial movement only together with said carriage and closure member, and in axial alignment with said cage, said mold comprising a stationary sector and two movable sectors complemented thereto and defining therewith an annular multiple-grooved body for receiving a plurality of belts, and power operated means on said carriage and extending through said closure member for supporting and manipulating said movable sectors while said mold is maintained in axial alignment with said cage, said power operated manipulating means comprising a pair of parallel sector rotating shafts extending through said closure member and means about said shafts permitting adjustment of said shafts toward and from each other to accommodate molds of different sizes while sealing said shafts to said closure to prevent passage of steam.

3. Apparatus for molding endless belts and the like, said apparatus comprising a cylindrical open ended heater having its axis disposed horizontally, said heater having a bayonet joint locking ring at its open end adapted to engage a closure member by and to be locked therewith by a rotary movement of the ring, guide rails extending axially of the heater, a carriage movable along said rails to and from the open end of the heater, a closure member non-rotatably mounted on said carriage for engagement with said heater, a cage mounted axially of said heater and having a flexible diaphragm adapted to embrace a drum-type curing mold, a curing mold supported on said carriage in fixed spaced relation thereto and on said closure member for axial movement only together with said carriage and closure member, and in axial alignment with said cage, said mold comprising a stationary sector and two movable sectors complemented thereto and defining therewith an annular multiple-grooved body for receiving a plurality of belts, and power operated means on said carriage and extending through said closure member for supporting and manipulating said movable sectors while said mold is maintained in axial alignment with said cage, said power operated manipulating means comprising a pair of parallel sector rotating shafts extending through said closure member and means about said shafts permitting adjustment of said shafts toward and from each other to accommodate molds of different sizes while sealing said shafts to said closure to prevent passage of steam said shafts being adjustable toward and from each other in an arcuate path, and sealing means on said closure member for sealing said shafts thereto at all positions thereof.

References Cited in the file of this patent

UNITED STATES PATENTS

| | | |
|---|---|---|
| 2,253,792 | Leavenworth | Aug. 26, 1941 |
| 2,364,167 | Scott | Dec. 5, 1944 |
| 2,583,085 | Campbell | Jan. 22, 1952 |
| 2,586,300 | Campbell | Feb. 19, 1952 |
| 2,587,119 | Davis et al. | Feb. 26, 1952 |